Figure 1:
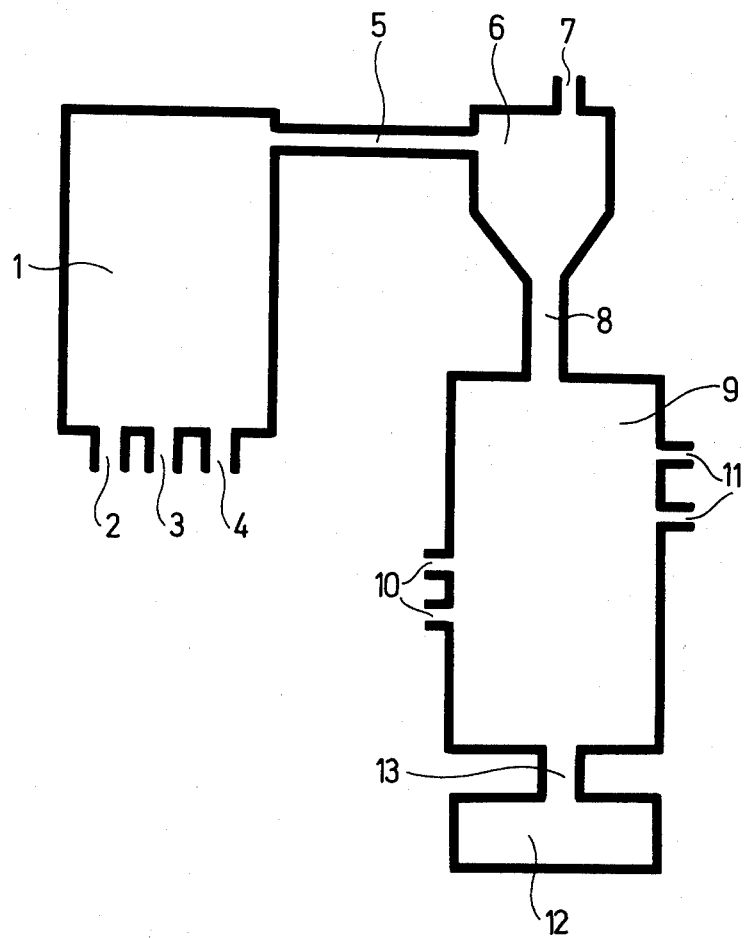

United States Patent [19]

Gál et al.

[11] 3,990,996

[45] Nov. 9, 1976

[54] PROCESS FOR THE CONTINUOUS PRODUCTION OF RANEY CATALYSTS

[75] Inventors: Sándor Gál; Béla Eröss; Ernö Pungor; Géza Siposs, all of Budapest; Adorján Monostory; József Barlai, both of Veszprem; Margit Szeiler nee Nemeth, Varpalota, all of Hungary; Peti

[73] Assignees: Budapesti Muszaki Egyetem, Budapest; Peti Nitrogenmuvek, Peti, both of Hungary

[22] Filed: Feb. 27, 1975

[21] Appl. No.: 553,486

Related U.S. Application Data

[63] Continuation-in-part of Ser. No. 468,062, May 8, 1974, abandoned.

[30] Foreign Application Priority Data

May 8, 1973 Hungary................. PE 877

[52] U.S. Cl............................. 252/463; 252/477 Q
[51] Int. Cl.² ......................................... B01J 21/04
[58] Field of Search..................... 252/477 Q, 463; 75/101 R, 119

[56] References Cited
UNITED STATES PATENTS

| | | | |
|---|---|---|---|
| 1,915,473 | 6/1933 | Raney............................ | 252/477 Q |
| 2,608,469 | 8/1952 | McMaster...................... | 252/477 Q |
| 3,139,408 | 6/1964 | Tumer et al. .................. | 252/477 Q |
| 3,235,513 | 2/1966 | Jung et al. .................... | 252/477 Q |
| 3,691,093 | 9/1972 | Frank et al. ................... | 252/477 Q |
| 3,809,658 | 5/1974 | Csuros et al. ................. | 252/477 Q |

*Primary Examiner*—W. J. Shine

[57] ABSTRACT

The invention relates to a continuous process for the preparation of Raney catalysts with controlled particle size, wherein the alloy of the catalytically active metal formed with aluminium and/or zinc is subjected to alkaline leaching, the hydrogen gas formed in this leaching step is separated and removed, the obtained product is washed, and the obtained catalyst with the desired particle size is separated. The improvement in this process comprises leaching the aluminium and/or zinc component of the alloy in a medium constantly kept in a turbulent flow, and removing the solid particles smaller than the desired range during the washing of the catalyst.

The invention relates further to an apparatus for carrying out the above process, comprising a reaction chamber 1 made of one or more reactor(s) and equipped with feeding inlets 2, 3, and 4, a separator 6 equipped with a gas removing outlet 7, a tubing connecting said reaction chamber 1 to said separator 6, a washing-separating-sorting unit 9 equipped with one or more washing liquid introducing inlet(s) 10 and washing liquid removing outlet(s) 11, a tubing 8 connecting said separator 6 to said washing-separating-sorting unit 9, a storing unit 12, and a tubing 13 connecting said washing-separating-sorting unit 9 to said storing unit 12.

According to the invention Raney catalysts with controlled particle size and constant characteristics can be prepared in a continuous operation.

4 Claims, 4 Drawing Figures

PROCESS FOR THE CONTINUOUS PRODUCTION OF RANEY CATALYSTS

This application is a continuation-in-part of co-pending application Ser. No. 468,062, filed May 8, 1974 and now abandoned.

This invention relates to a process and apparatus for the continuous production of Raney catalysts.

As known, several chemical processes involve reactions carried out at atmospheric or superatmospheric pressures in heterogeneous phases, in the presence of suspended Raney catalysts. The Raney catalysts applied in these chemical processes are prepared according to the known, batchwise technique by grinding and screening the basic alloy, treating the screened alloy with an alkali, washing the product until neutral, and usually, in order to produce the desired particle size, re-grinding the obtained washed catalyst. This procedure, however, does not produce catalysts with constant and reproducible characteristics (e.g. particle size, particle size distribution, inactive metal content, catalytic activity, etc.) which would be principally important in the industrial safety and reproducibility of the chemical processes employing said catalysts. It is a further disadvantage that during the known processes for the preparation of Raney catalysts the alloy fed in is broken up into small fragments to a great extent, and this fragmentation cannot be controlled. Thus, in order to ensure the optimum particle size of the catalysts, which is of decisive importance with respect to their activity, the known processes always start from alloys with relatively large particles, and the catalyst obtained in the alkaline leaching step is ground to the desired particle size. The resulting particle-size distribution is, however, not sharp enough, and the new surfaces formed in the subsequent grinding step decrease the activity of the catalyst.

The invention relates to a process and an apparatus by the aid of which the above disadvantages can be eliminated, and Raney catalysts with controlled particle size can be produced in a continuous operation.

The invention is based on the recognition that when the alkaline leaching of the basic alloy is carried out in a system of fast, turbulent flow, the disintegration of the starting alloy particles can be eliminated or suppressed to minimum. It has been observed further that the catalyst particles can be sorted during the washing step, i.e. the optionally present particles smaller than the desired range can be removed with the washing liquid as floating impurities. Based on the above principle, a continuous process has been developed for the production of Raney catalysts with controlled particle size.

Thus, in one aspect, the invention relates to a continuous process for the preparation of Raney catalysts with controlled particle size, wherein the alloy of the catalytically active metal formed with aluminium and/or zinc is subjected to alkaline leaching, the hydrogen gas formed in this leaching step is separated and removed, the obtained product is washed, and the thus-obtained catalyst with the desired particle size is separated. The improvement in this process comprises leaching the aluminium and/or zinc component of the alloy in a medium constantly kept in a turbulent flow, and removing the solid particles smaller than the desired range during the washing of the catalyst.

According to a preferred method of implementation of the process according to the invention, the leaching reaction is carried out in a reaction space having from 5 to 50 times longer height than its largest dimension perpendicular to its height. This form of reaction space is advantageous from the point of view of creating turbulent flow in the suspension containing the alloy to be leached in alkaline solution. It has been established that the turbulent flow can be readily ensured in this reaction space by setting the residence time of the solid phase in the leaching system between 2 and 10 minutes, preferably between 5 and 8 minutes. This can be ensured e.g. by adjusting the alkali concentration of the liquor preferably between 5 to 15% and conducting the leaching at a preferable temperature of 60 to 120° C.

In its other aspect, this invention relates to an apparatus for carrying out the above process. The schematic drawing of the apparatus according to the invention is shown in FIG. 1.

The apparatus shown in FIG. 1 consists of a reaction chamber 1 comprising one or more reactor(s) and equipped with feeding inlets 2, 3 and 4, a separator 6 equipped with a gas removing outlet 7, a tubing 5 connecting said reaction chamber 1 with said separator 6, a washing-separating-sorting unit 9, equipped with one or more washing liquid introducing inlet(s) 10 and washing liquid removing outlet(s) 11, a tubing 8 connecting said separator 6 with said washing-separating-sorting unit 9, a storing unit 12, and a tubing 13 connecting said washing-separating-sorting unit 9 with said storing unit 12.

In the preparation of the catalyst, the alloy ground to the desired particle size enters reaction chamber 1 through inlet 2, while the alkali required for leaching enters through inlet 3. In order to ensure the temperature necessary for the reaction (usually 60 to 120° C, preferably 70° to 110° C), a heating medium (generally steam) is introduced into the system through inlet 4. The evolved hydrogen and the introduced heating medium keeps the slurry in a fast, turbulent flow in the reaction chamber. The obtained three-phase system (alkaline solution, solid catalyst and hydrogen gas) is passed into separator 6 through tubing 5 connected to the upper part of the reaction chamber. Hydrogen is removed from separator 6 through outlet 7, while the suspension containing the catalyst is passed into the washing-separating-sorting unit through tubing 8. A washing liquid (generally water) is fed into the washing-separating-sorting unit through inlet(s) 10, in order to remove the solid substances which are undesired because of their composition (e.g. metal oxides) or dimensions (e.g. particles smaller than 30 μm). The washing liquid, containing floating solid particles is removed through outlet(s) 11. The nearly neutral end-product with the desired particle size distribution is removed from unit 9 through tubing 13 as a suspension or paste, and passed into storing unit 12.

Instead of steam, any other gaseous medium heated to the appropriate temperature (e.g. hot air or nitrogen, etc.) can be used to heat the reactor, provided that the components of the heating medium do not react with the catalyst or the solution.

Figure 2:
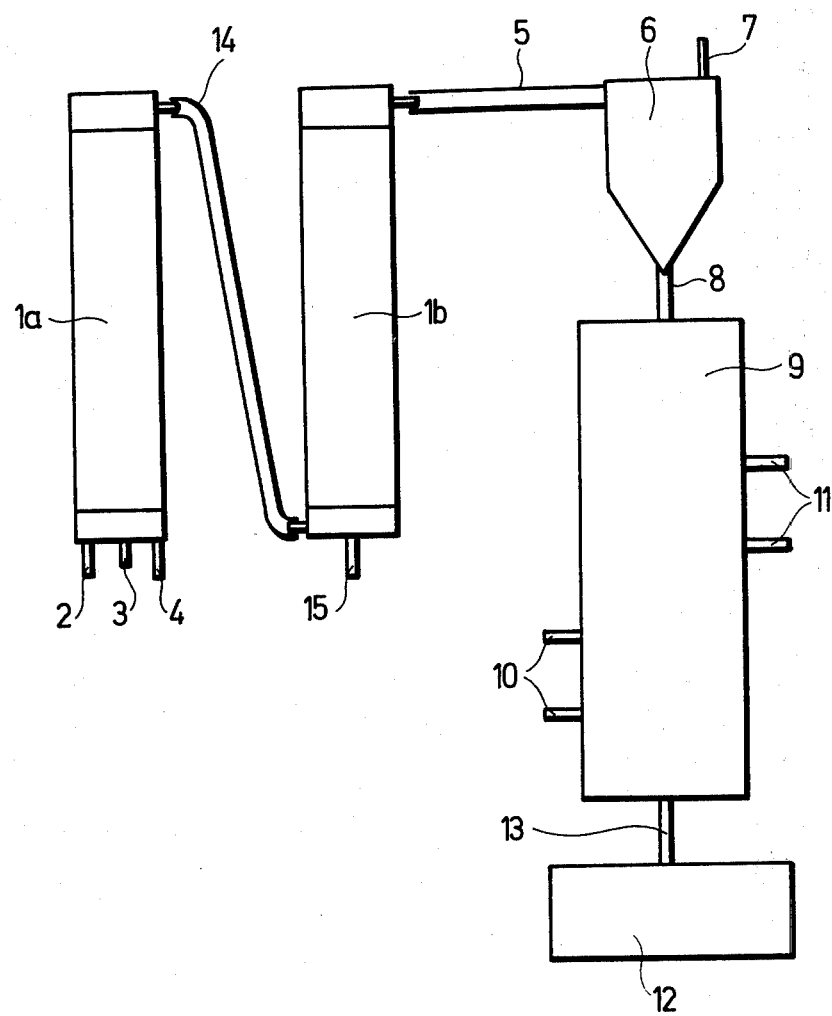

As mentioned above, reaction chamber 1 may consist of one or more reactors, connected in series to each other. FIG. 2 shows an apparatus in which reaction chamber 1 comprises two reactors 1a and 1b, connected to each other through tubing 14. These reactors are preferably cylindrical bodies with length:diameter ratios of 5:1 to 50:1. If desired, additional heating medium (e.g. steam) may be fed into the second reactor through inlet 15, to ensure the optimum temperature for the given reaction.

Figure 3:
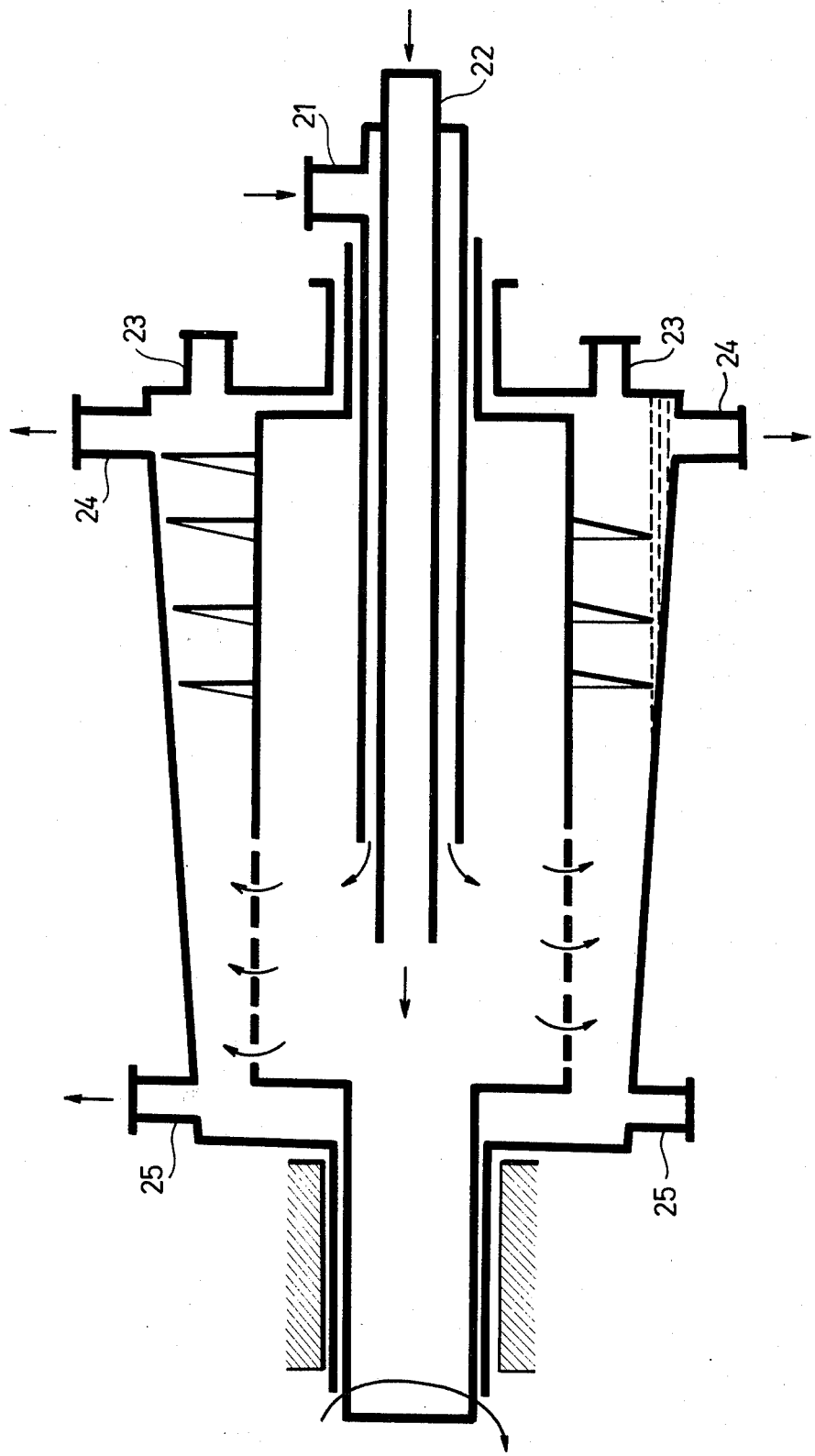

The washing-separating-sorting unit may be, for example, a centrifuge of continuous operation equipped with a pulley conveyor, as shown in FIG. 3. The suspension leaving separator 6 is fed axially into the centrifuge through pipe end 21, while the washing liquid is fed through pipe end 22. The exhausted washing liquid containing floating solid particles exits through overflow lips 23 and bypass pipe end 24, while the catalyst exits through pipe end 25. The half angular subtense of the centrifuge mantel is preferably 8° to 24°, particularly 10° to 18°.

Figure 4:
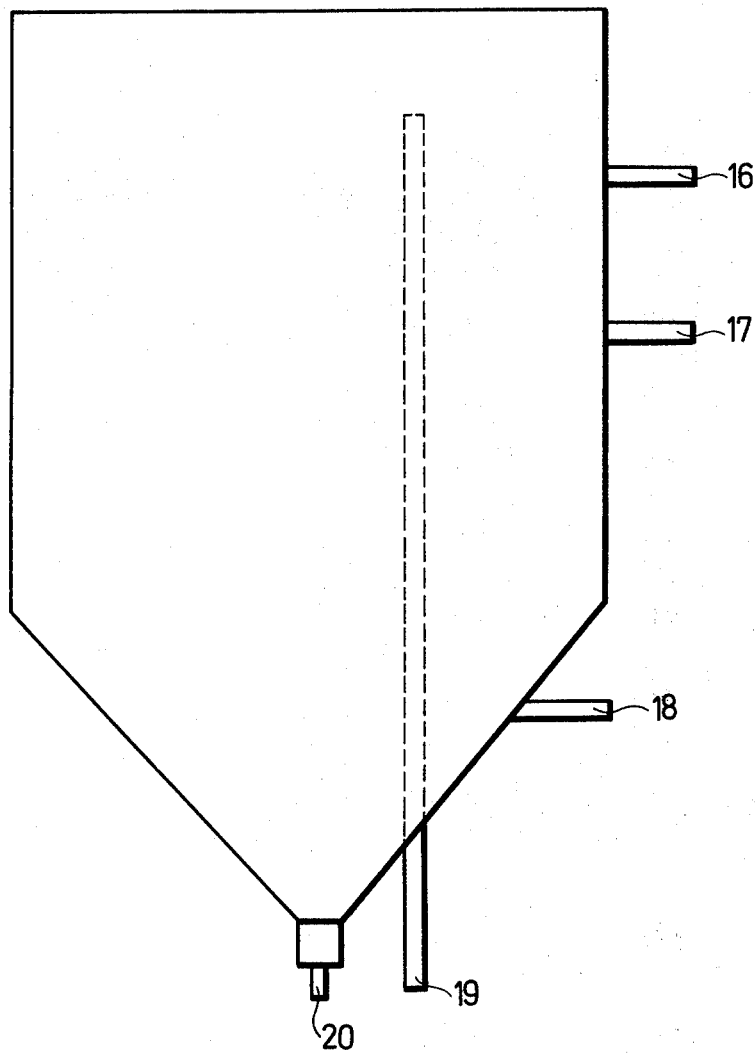

According to another preferred embodiment of the invention, washing-separating-sorting unit 9 may be a cylindrical sedimentator with a conic bottom. The unit is shown in FIG. 4. The suspension leaving separator 6 is fed into the sedimentator through pipe end 16, while the washing liquid is introduced through pipe ends 17 and 18. Parallel to the longitudinal axis, an overflow pipe 19 is mounted onto the sedimentator, through which the washing liquid containing floating impurities leaves the system. The catalyst is removed at the bottom of the sedimentator through pipe end 20.

Finally, the washing-separating-sorting unit may be a tube of vertical longitudinal axis, preferably with a rectangular cross-section, the surface of which is partly or totally covered with one or more magnet(s), movable along with or opposite to the suspension. These magnets are arranged so as to ensure a field strength not less than 95 Oersteds even at the points where the suspension is most remote from the magnet. In this instance sorting is performed by the magnetic field. In order to ensure a better separation, reducing elements can also be installed into the tube.

The main advantage of the process and apparatus according to the invention is that they permit continuous production. As a further advantage, the reaction proceeds quickly in the flowing system, providing a great capacity even in a relatively small apparatus. The process of the invention yields catalysts with controlled particle size, having strictly the same characteristics under identical operative conditions. Furthermore, optimum manufacturing conditions can be ensured for every type of catalyst by the judicious choice of the parameters (number and size of the reactors, reaction temperature, etc.). The quick reaction and the strictly uniform quality of products allow the preparation of fresh catalysts necessary for a given chemical process, eliminating thereby the problems connected to the storage of Raney catalysts arising from their pyrophoric nature. The process according to the invention can equally be carried out in open and closed systems. The use of a closed system is particularly advantageous since it provides a safe and conventional use in chemical plants as well.

The invention is elucidated in detail by the aid of the following non-limiting Examples.

EXAMPLE 1

A suspension of 2 kg. of a Ni-Al alloy (Ni-content: 50%, particle size: 45 to 150 $\mu$m) in 40 l. of water is introduced through inlet 2 into reactor 1a of the apparatus shown in FIG. 2. The introduction takes 2 hours at a constant rate. During this time a total amount of 20 l. of a 20% aqueous sodium hydroxide solution is introduced through inlet 3, and an overheated steam at about 120°C introduced through inlet 4 into said reactor. The system in a quick, turbulent flow is fed into reactor 1b through tubing 14 at a rate of 20 l./h., and overheated steam at about 120° C is introduced through inlet 15 into said reactor. The temperature in both reactors is 92° to 95° C, and the concentration of the alkali is 7.2 to 7.4%. Both reactors are cylindrical bodies, 1000 mm. in length and 50 mm. in diameter. The mixture filling these reactors consists of 5 to 8% by weight of suspended solid particles, and about 46 to 50% by weight of alkaline liquid, whereas the residue is hydrogen gas. Thus the reactors are filled with a foam-like system, wherein the suspended solid particles are in a constant quick turbulent flow. The residence time of the solid substance in the complete leaching system is 5 to 8 mm. This mixture is passed from reactor 1b through tubing 5 into separator 6, where hydrogen, evolved in a rate of 1.2 m³ per hour, is separated. In the separator the mixture cools to 80° to 85° C. Then the mixture is passed into washing-separating-sorting unit 9 through tubing 8 at a rate of 18.5 l./h. The washing-separating-sorting unit is a body of vertical longitudinal axis and rectangular cross-section, with dimensions of 1000 × 125 × 12 mm., one side of which being made of stainless steel, 0.5 mm. in thickness, and the other three sides being made of plastic sheets, 10 mm. in thickness. In order to ensure better separation, plastic reducing elements are installed into certain parts of the tube to reduce the diameter to 4 mm. or 8 mm., respectively. Along the steel side of the unit, permanent magnets are arranged on an endless rubber band moving with a velocity of 0.25 m./min., in a direction opposite to the movement of the suspension. The spacing of the magnets is 75 mm. The field strength is 820 to 860 Oersteds at the surface of the magnets, while 620 to 680 Oersteds at the inner side of the steel sheet.

A total amount of 85l. of water are introduced into unit 9 through inlets 10 at a rate of 42.5 l./h. The spent washing liquid exits through outlets 11. The produced Raney nickel catalyst is passed into storing unit 12 through tubing 13.

The pH of the liquid over the thus-obtained Raney nickel catalyst is 7.2. The particle size distribution of the product was determined by X-ray adsorption method. According to the measurement the sample contains practically no particles with a diameter less than 30 $\mu$m. For comparison, the particle size distribution of a Raney nickel catalyst prepared according to the conventional batchwise method was also determined. This latter sample also contains particles with diameters as low as 1 $\mu$m.

The obtained catalyst has the following characteristics:
Al-content: 9.3%.
catalytic activity: rate of hydrogen uptake when hydrogenating acetone = 4.8 ml./min. particle size: 73% by weight of the product has a size of 70 to 120 $\mu$m.

EXAMPLE 2

One proceeds as described in Example 1, with the difference that a total amount of 1.8 kg. of Co-Al alloy (Co-content: 55%, particle size: 100 to 250 $\mu$m), and 18 l. of a 20% aqueous sodium hydroxide solution are introduced into reactor 1a within 2 hours. The temperature is maintained in both reactors at 94° to 97° C, and the concentration of alkali at 6.5 to 6.8%. The suspension at a temperature of 65° to 70° C, removed from separator 6, is washed as described in Example 1, with the difference that a total amount of 49 l. of water are used for washing.

The pH of the liquid over the produced Raney cobalt catalyst is of about 8.0. The obtained catalyst has the following characteristics:
Al-content: 11.4%.
catalytic activity: rate of hydrogen uptake when hydrogenating acetone: 3.6 ml./min.
particle size: 76% by weight of the product has a size of 150 to 200 $\mu$m.

EXAMPLE 3

A total amount of 2.5 kg. of Ni-Zn-Al alloy (composition: 40%, Ni, 50% Zn and 10% Al; particle size: 60 to 110 $\mu$m) suspended in 25 l. of water, and 28 l. of a 20% aqueous sodium hydroxide solution are fed at a constant rate within 2 hours into reactor 1a shown in FIG. 2 through inlets 2 and 3, respectively. Overheated steam at 120° C is fed into reactor 1a through inlet 4. The system, in a quick, turbulent flow, is fed into reactor 1b through tubing 14 at a rate of 27 l./h., and overheated steam at about 120° C is introduced into said reactor through inlet 15. The temperature is maintained in both reactors 105° to 108° C, and the alkali concentration is 10.2 to 10.8%. The dimensions of reactors 1a and 1b are the same as given in Example 1. The three-phase mixture, at a temperature of 105° to 108° C, is passed into separator 6 at a rate of 27 l./h., where hydrogen is separated. The total amount, 54 l., of the liquid fed into the separator is passed into washing-separating-sorting unit 9 at a rate of 27 l./h. The temperature of the feed is 70° to 75° C. The washing-separating-sorting unit is a centrifuge of continuous operation equipped with a pulley conveyor (see FIG. 3.). The suspension leaving the separator is introduced axially into the centrifuge through pipe end 21 at a rate of 27 l./h., while a total amount of 180 l. of water is introduced into the centrifuge through pipe end 22 at a rate of 90 l./h. The spent washing liquid leaves the centrifuge through overflow lips 23 and bypass pipe ends 24, while the product exits through pipe end 25. The engineering data of the centrifuge are as follows: half angular subtense of the mantel: $\alpha = 12°$; length of the drum: 580 mm., pitch of the pulley wheel: 2 mm., rotation speed of the pulley wheel: 5 r.p.m.

The pH of the liquid over the produced Raney nickel catalyst is between 7.3 and 7.6.

The characteristics of the catalyst are as follows:
Al-content: 3.6%
Zn-content: 6.3%
catalytic activity: rate of hydrogen uptake when hydrogenating acetone = 2.8 ml./min. particle size: 64% by weight of the product has a size of 70 to 90 $\mu$m.

EXAMPLE 4

A total amount of 2.3 kg. of Cu-Al alloy (Cu-content: 60%, particle size: 70 to 170 $\mu$m) suspended in 50 l. of water and 23 l. of a 20% aqueous sodium hydroxide solution are fed at a constant rate within 2 hours into reactor 1a of the apparatus shown in FIG. 2, through inlets 2 and 3, respectively. Overheated steam at about 120° C is introduced into said reactor through inlet 4. The system is passed in quick, turbulent flow at a rate of 36 l./h. into reactor 1b through tubing 14, and overheated steam at about 120° C is fed into said reactor through inlet 15. The temperature is in both reactors 68° to 75° C, and the alkali concentration is 7 to 9%. The dimensions of reactors 1a and 1b are the same as given in Example 1. The three-phase mixture, at a temperature of 68° to 75° C, is fed into separator 6 at a rate of 36 l./h., where hydrogen is separated. The total amount, 73 l., of the suspension fed into the separator is passed into washing-separating-sorting unit 9 at a rate of 36 l. hours. The temperature of the feed is 60° to 65° C. The washing-separating-sorting unit is a cylindrical sedimentator with a conic bottom, as shown in FIG. 4. The suspension leaving the separator is passed into the sedimentator through pipe end 16, while a total amount of 234 l. of washing water is introduced through pipe ends 17 and 18 at a rate more than 6.5 times higher than that of the suspended material. The spent washing liquid, containing floating impurities, about some $\mu$ m in particle size, leaves the system through overflow pipe 19, while the end-product is removed through pipe end 20.

The engineering data of the sedimentator are as follows: the diameter of the cylindrical part is 350 mm., the total height of the sedimentator is 560 mm., the diameter of the overflow pipe is 16 mm., its height along the longitudinal axis of the sedimentator is 545 mm., its construction material is stainless steel. Pipe end 16 serving to introduce the suspension is attached to the sedimentator at a height of 410 mm., at a very low angle with respect to the generatrix of the cylinder.

The pH of the liquid over the produced Raney copper catalyst is between 7.9 and 8.1. The characteristics of the catalyst are as follows:
Al-content: 11.6%.
catalytic activity: rate of hydrogen uptake when hydrogenating acetone = 1.8 ml./min.
particle size: 56.6% by weight of the product has a size of 110 to 140 $\mu$m.

What we claim is:
1. In a continuous process for the preparation of Raney catalysts with controlled particle size, wherein the alloy of the catalytically active metal formed with aluminium and/or zinc is subjected to alkaline leaching, the hydrogen gas formed in this leaching step is separated and removed, the obtained product is washed, and the thus-obtained catalyst with the desired particle size is separated, the improvement which comprises leaching the aluminium and/or zinc component of the alloy in a hot gaseous medium constantly kept in a turbulent flow, in which said medium is selected from the group consisting of reaction inert gases and steam and removing the solid particles smaller than 30 $\mu$m during the washing of the catalyst.

2. The process as claimed in claim 1, wherein the leaching reaction is carried out in a reaction space having from 5 to 50 times longer height than its largest dimension perpendicular to its height.

3. The process, as claimed in claim 1, wherein the gaseous medium is preheated to a temperature such that it insures an optimum temperature for the reaction.

4. The process, as claimed in claim 1, wherein said reaction is carried out in a cylindrical reactor having a length:diameter ratio of 5:1 to 50:1.

* * * * *